US012567694B2

(12) United States Patent

Li

(10) Patent No.: US 12,567,694 B2
(45) Date of Patent: Mar. 3, 2026

(54) HIGH DENSITY CABLE STRUCTURE AND WIRE TERMINATION

(71) Applicant: Intel Corporation, Santa Clara, CA (US)

(72) Inventor: Xiang Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 733 days.

(21) Appl. No.: 17/853,901

(22) Filed: Jun. 29, 2022

(65) Prior Publication Data

US 2022/0336989 A1 Oct. 20, 2022

(51) Int. Cl.

| | |
|---|---|
| ***H01R 13/26*** | (2006.01) |
| ***H01R 12/75*** | (2011.01) |
| ***H01R 13/40*** | (2006.01) |
| *H01R 4/02* | (2006.01) |
| *H01R 12/53* | (2011.01) |
| *H01R 13/03* | (2006.01) |
| *H01R 13/50* | (2006.01) |

(52) U.S. Cl.

CPC ............. *H01R 13/26* (2013.01); *H01R 12/75* (2013.01); *H01R 13/40* (2013.01); *H01R 4/023* (2013.01); *H01R 12/53* (2013.01); *H01R 13/03* (2013.01); *H01R 13/50* (2013.01)

(58) Field of Classification Search

CPC ........ H01R 13/02; H01R 13/40; H01R 13/50; H01R 13/03; H01R 12/75; H01R 12/53; H01R 4/023

USPC ........................ 439/76.1, 636, 637, 654, 908

See application file for complete search history.

(56) References Cited

U.S. PATENT DOCUMENTS

| | | | | |
|---|---|---|---|---|
| 5,571,021 | A * | 11/1996 | Kawabe | H01R 12/79 439/70 |
| 6,971,887 | B1 * | 12/2005 | Trobough | H05K 7/1092 439/71 |
| 7,517,228 | B2 * | 4/2009 | Baskaran | H05K 7/1092 439/71 |
| 8,298,009 | B2 * | 10/2012 | Elkhatib | H01R 12/594 439/581 |
| 9,478,885 | B2 * | 10/2016 | MacDougall | H01R 12/73 |
| 10,332,655 | B1 * | 6/2019 | Sugiyama | H01B 11/1895 |
| 10,651,606 | B2 * | 5/2020 | Little | H01R 13/6593 |
| 10,741,941 | B2 * | 8/2020 | Wu | H01R 43/0256 |
| 10,873,160 | B2 * | 12/2020 | Henry | H01R 13/6592 |
| 12,347,985 | B2 * | 7/2025 | Zeng | H01R 12/75 |
| 2018/0366852 | A1 * | 12/2018 | Yang | H01R 12/775 |
| 2021/0185813 | A1 * | 6/2021 | Huang | H05K 1/118 |
| 2021/0376507 | A1 * | 12/2021 | Guo | H01R 13/629 |

(Continued)

OTHER PUBLICATIONS

Wikipedia, "Small form-factor pluggable tranceiver," downloaded on Jun. 26, 2022, from https://en.wikipedia.org, 15 pages.

*Primary Examiner* — Harshad C Patel

(74) *Attorney, Agent, or Firm* — NICHOLSON DE VOS WEBSTER & ELLIOTT LLP

(57) ABSTRACT

Methods and apparatus relating to a high density cable structure and wire termination are described. In one embodiment, a plug structure includes a paddle card to couple two wires to two gold fingers and a first add-on plug to couple a first wire to a first gold finger. The paddle card and the first add-on plug are to be stacked to form a single plug structure having a first row of gold fingers and a second row of gold fingers. Other embodiments are also claimed and disclosed.

20 Claims, 7 Drawing Sheets

(56) References Cited

U.S. PATENT DOCUMENTS

| | | | | |
|---|---|---|---|---|
| 2022/0294168 | A1* | 9/2022 | Lin | H01R 12/70 |
| 2022/0385010 | A1* | 12/2022 | Zeng | H01R 12/75 |

* cited by examiner

150

HIGH DENSITY CABLE STRUCTURE AND WIRE TERMINATION

FIELD

The present disclosure generally relates to the field of electronics. More particularly, an embodiment relates to a high density cable structure and wire termination.

BACKGROUND

High speed I/O is sensitive to signal loss and a cable is considered the preferred interconnect solution for a long reach system, in part, because a Printed Circuit Board (PCB) has relatively more signal loss than a cable.

However, compared to PCB routing, a cable has a relatively large form factor. Hence, a high density cable solution is needed to support high speed I/O bandwidth.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, a high density cable solution is needed to support high speed I/O bandwidth. To this end, some embodiments relate to a high density cable structure and wire termination. In an embodiment, a plug structure includes a paddle card to couple two wires to two gold fingers and a first add-on plug to couple a first wire to a first gold finger. The paddle card and the first add-on plug are to be stacked to form a single plug structure having a first row of gold fingers and a second row of gold fingers.

Figure 1A:
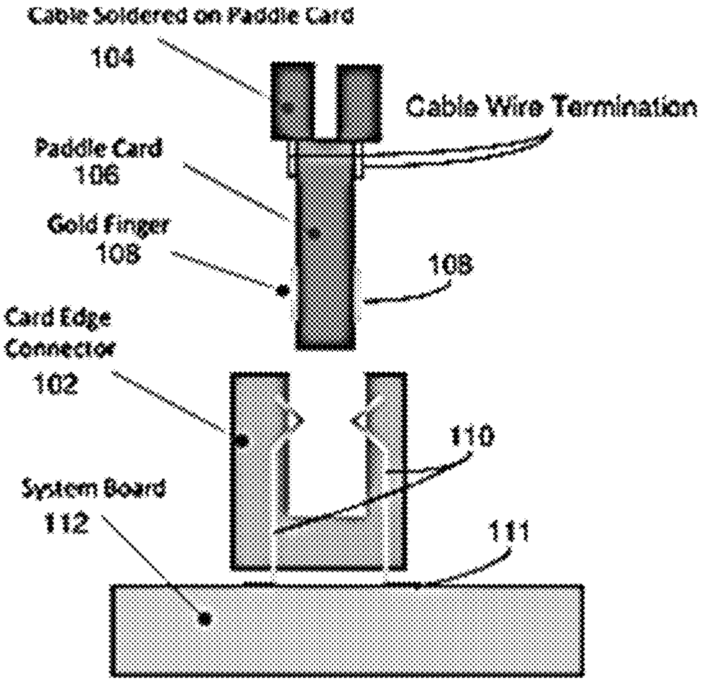
FIG. 1A illustrates a sample card edge connector and cable solution.

FIG. 1A illustrates a sample card edge connector and cable solution. Edge card cables are widely used since they are easy to handle for a user and relatively low cost to manufacture. The receptacle for an edge card cable is a card edge connector 102. A cable plug 104, in turn, uses a PCB paddle card 106 with gold finger(s) 108 to mate with connector pins 110. The cable plug 104 is formed by soldering a cable on the paddle card (and PCB routing on the paddle card) and provides a connection between the gold finger(s) 108 and a cable termination pad 111 that is couple to a system board 112. As discussed herein, a "gold finger" or "GF" generally refers to a conductive metal that has been gold-plated for improved electrical conductivity and/or mechanical longevity in situations where two metal contacts are removably coupled.

Figure 1B:
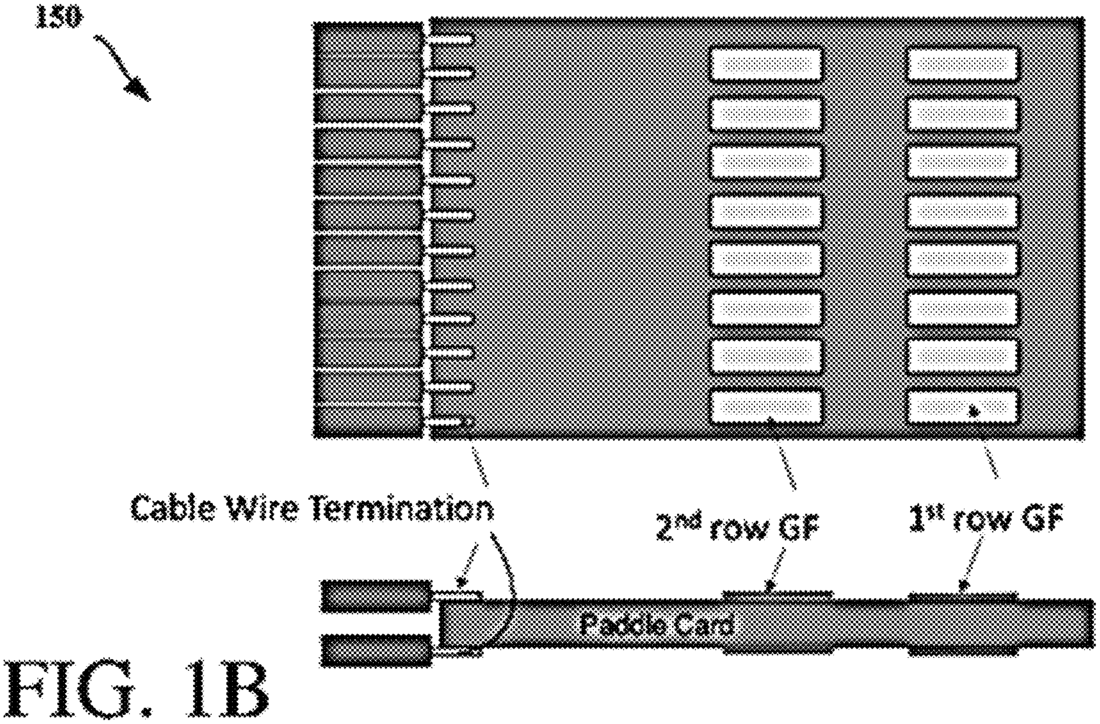
FIG. 1B illustrates a sample Quad Small Form-Factor Pluggable-Double Density (QSFP-DD) high density cable plug.

FIG. 1B illustrates a sample Quad Small Form-Factor Pluggable-Double Density (QSFP-DD) high density cable plug 150. The top portion of FIG. 1B shows a top view of the sample high density cable solution and the bottom portion of FIG. 1B shows a side view of the sample high density cable solution. To support high density, a dual row gold finger is used as shown in FIG. 1B.

As shown in FIGS. 1A and 1B, a wire is soldered on both the top side and the bottom side of the paddle card. Due to size of the wire, the wire termination still limits the cable density. For example, the QSFP-DD connector pitch is still 0.8 millimeters (mm). Also, the two rows of gold fingers for the QSFP-DD solution are located one the same surface of the paddle card (on both sides of the paddle card as shown) and, as a result, the connector pins for the 2nd row have to be much longer for mating. Longer pins generally reduce electrical performance.

Figures 2A, 2B:
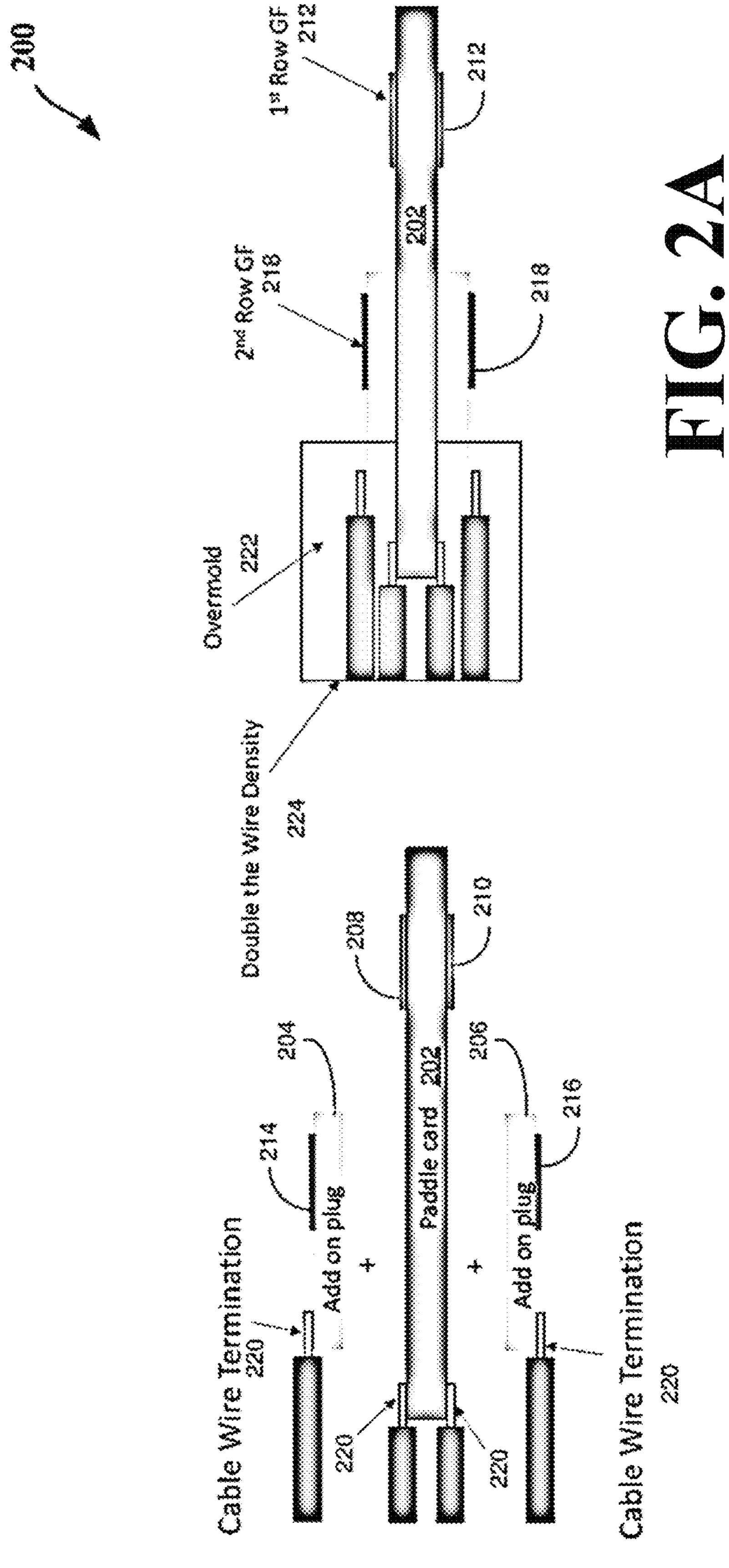
FIG. 2A illustrates a plug structure 200, according to an embodiment.
FIG. 2B illustrates exploded views of some of the components of the plug structure shown in FIG. 2A.

FIGS. 2A and 2B illustrate a plug structure 200, according to an embodiment. FIG. 2B illustrates an exploded view of some components of the plug structure shown in FIG. 2A. There is a paddle card 202 and two add-on plugs 204/206, which may be stacked together to form the structure shown on the right side of FIG. 2. The paddle card gold fingers 208/210 are used for the 1st row connection 212 and add-on plug gold fingers 214/216 are used for the 2nd row connection 218 as shown.

While some embodiments are discussed with reference to add-on plugs, embodiments are not limited to this and more or less add on plugs may be used.

The add-on plugs 204/206 may be made with a PCB and/or a plug connector (pin and housing). The add-on plugs are then attached to the paddle card 202, e.g., with help of one or more alignment features (such as one or more pins). The wire termination 220 may be covered by overmold 222, e.g., for protection, insulation, etc.

As shown in FIGS. 2A and 2B, each add-on plug 204/206 has its own cable wire termination 220. As discussed herein, an "overmold" generally refers to a mold formed by an injection molding process used to mate/mold one plastic (e.g., a rubber-like plastic such as a Thermoplastic Elastomer (TPE)) over the top of another component (e.g., a substrate such as shown in FIGS. 2A, 2B).

Some embodiments provide one or more of the following features: (1) an add-on plug has its own cable termination, which would support two additional rows of wire that will double the wire density (224). The connector pin pitch can be reduced to approximately 0.4-0.5 mm pitch with significant cable density improvement; and/or (2) the stacked 2nd row gold finger 218 can help to reduce the connector pin length; thus, reducing the plug and connector overall length for better electrical performance and/or density.

Figure 3:
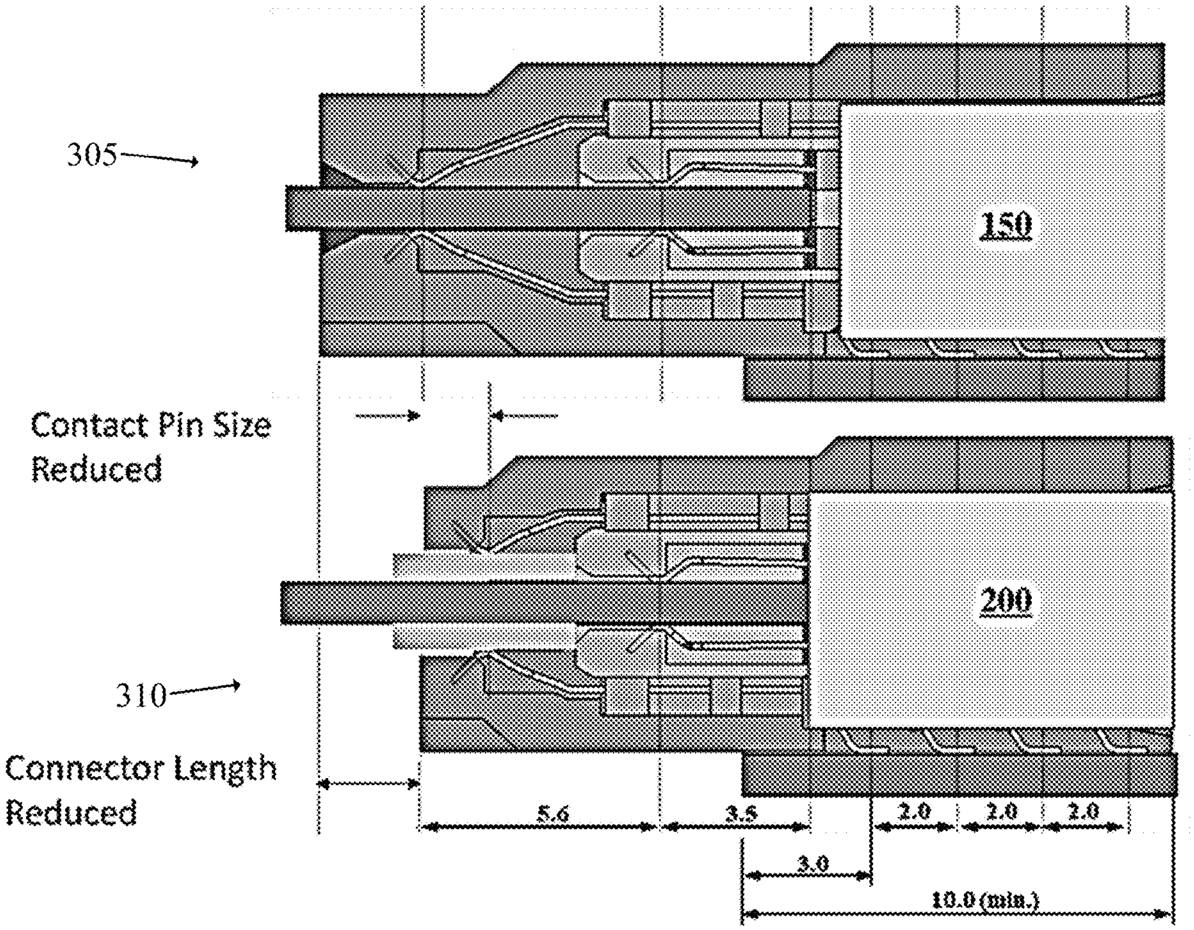
FIG. 3 illustrates a length comparison for cable structures 305, 310 with the plug structures 150, 200 of FIG. 1B and FIG. 2, respectively, according to an embodiment.

FIG. 3 illustrates a length comparison of the cable/plug structure 305 for the plug structure 150 with the cable/plug structure 310 for the plug structure 200, according to an embodiment. As can be seen, the contact pin size is reduced as well as the connector length. As shown, the plug 200 will have better electrical performance than the plug 150.

Moreover, the numbers at the bottom of FIG. 3 illustrate sample values in millimeters according to at least one embodiment, but embodiments are not limited to these measurements and the size of components may be modified depending on the implementation.

Figure 4:
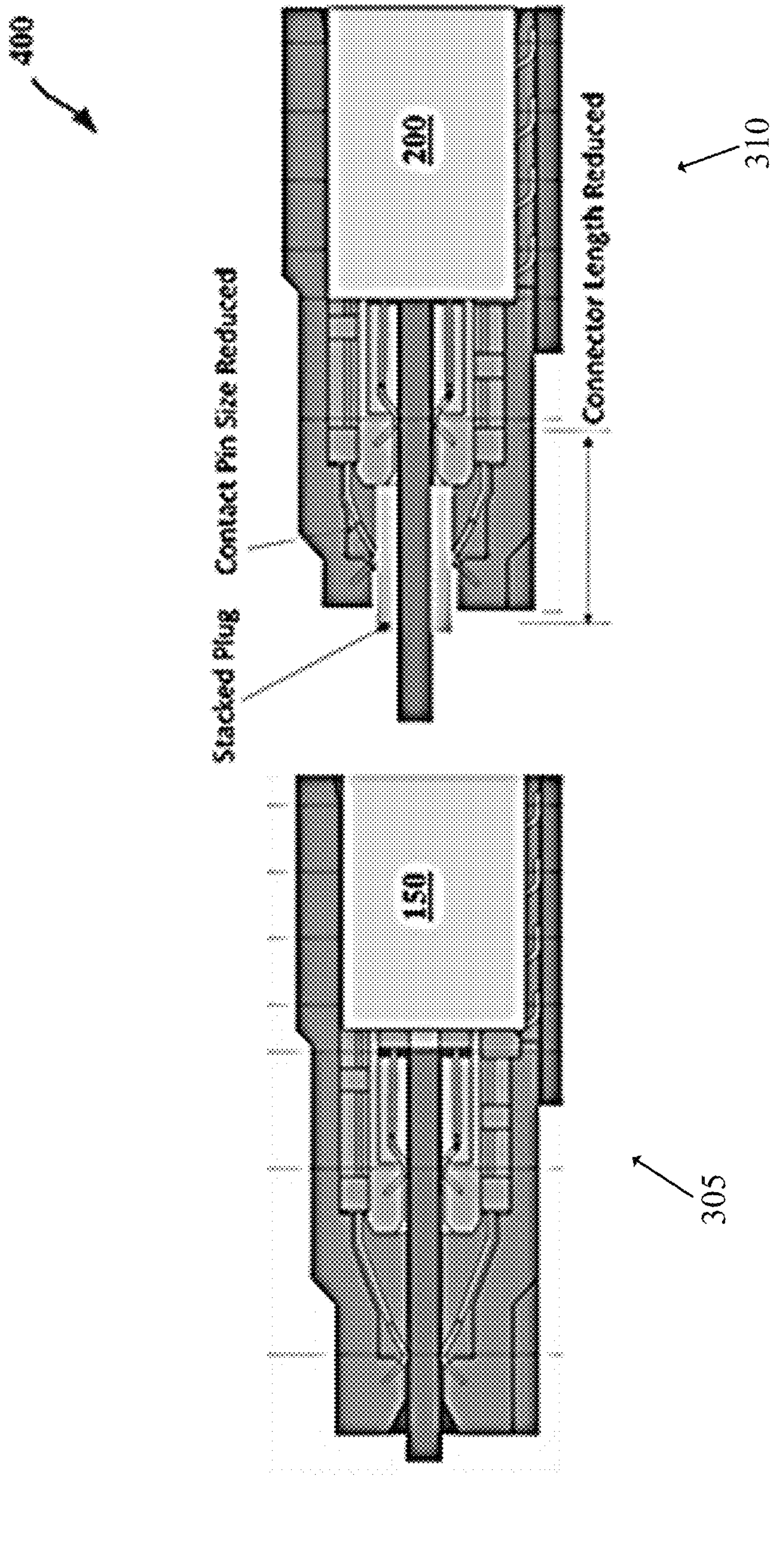
FIG. 4 illustrates a width comparison of the plug structures 150, 200 of the cable embodiments of FIG. 3, according to an embodiment.

FIG. 4 illustrates a width comparison of the cable/plug structure 305 for the plug structure 150 with the cable/plug structure 310 for the plug structure 200, according to an embodiment. As can be seen both contact pin size and connector length are reduced, while maintaining the same or similar width with approximately double the wire density.

Figure 5:
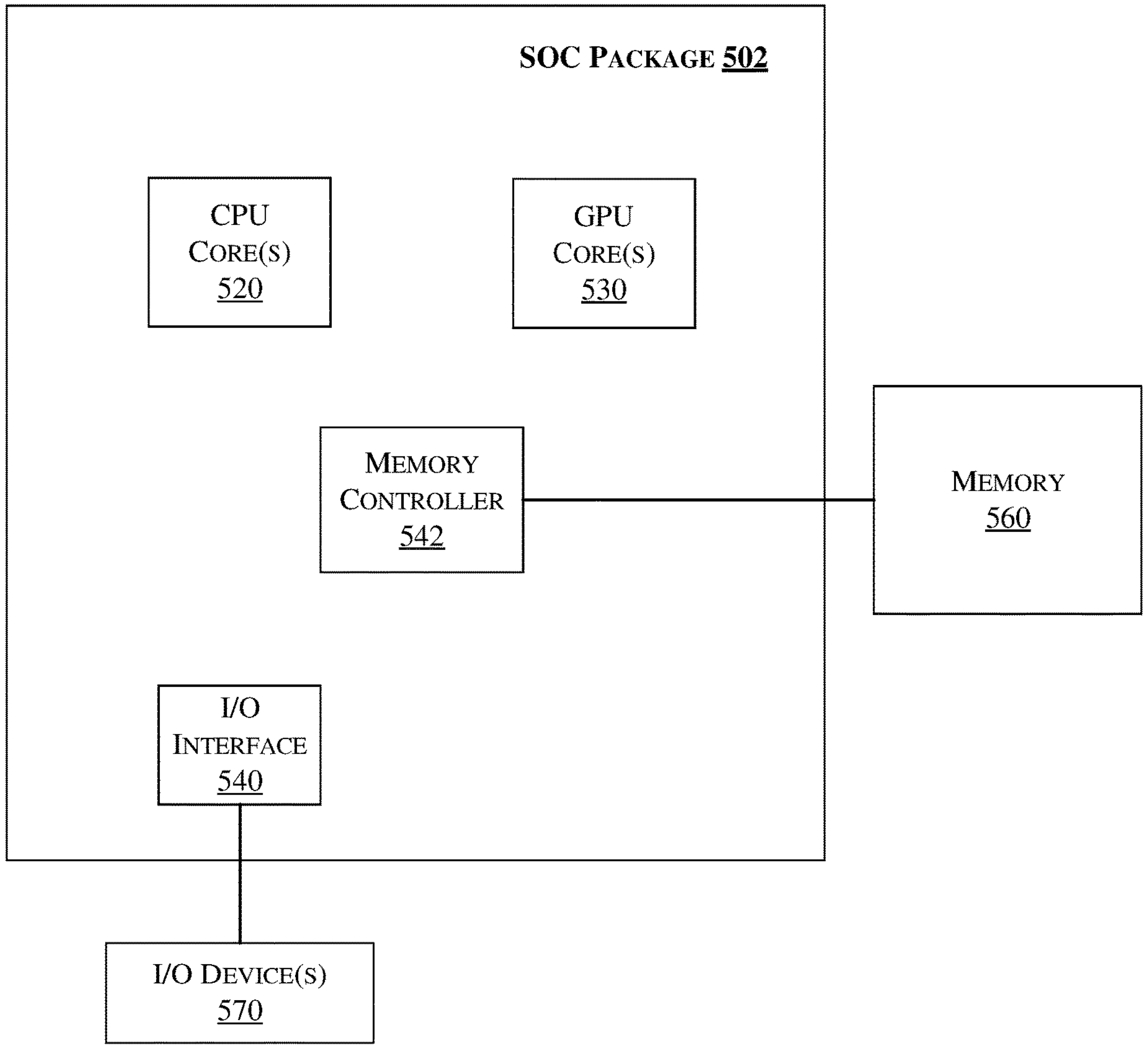
FIG. 5 illustrates a block diagram of an embodiment of a computing system, which may be utilized in various embodiments discussed herein.

One or more components discussed with reference to FIGS. 5-7 (including but not limited to I/O devices, memory/storage devices, graphics/processing cards/devices, network/bus/audio/display/graphics controllers, wireless transceivers, etc.) may be coupled using the high density cable structure and/or wire termination designs discussed herein. More particularly, FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device (s) 570 may include one or more of a keyboard, a mouse, a touchpad, a display, an image/video capture device (such as a camera or camcorder/video recorder), a touch screen, a speaker, or the like.

Figure 6:
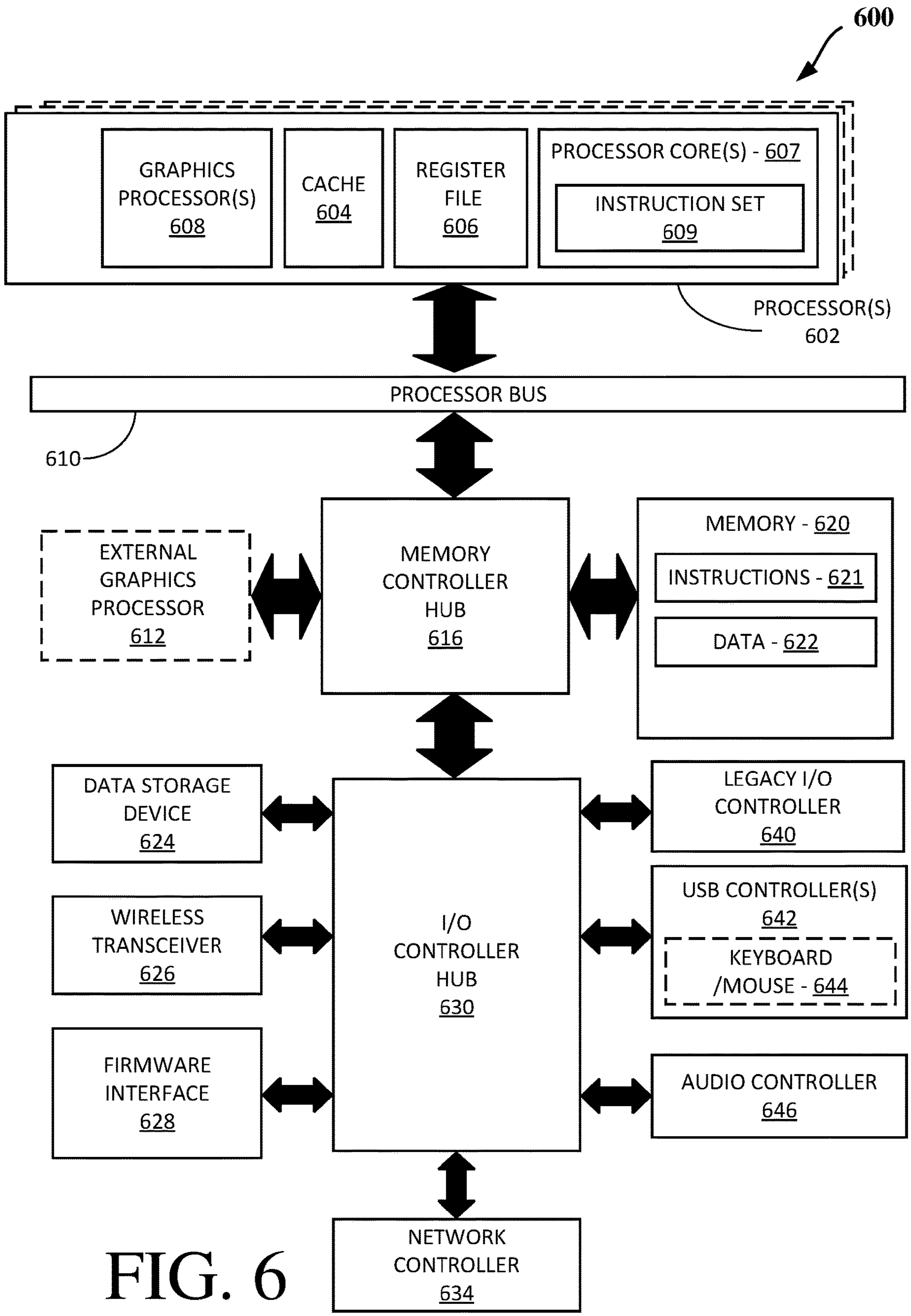
FIG. 6 illustrates a block diagram of an embodiment of a computing system, which may be utilized in various embodiments discussed herein.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random access memory (DRAM) device, a static random access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
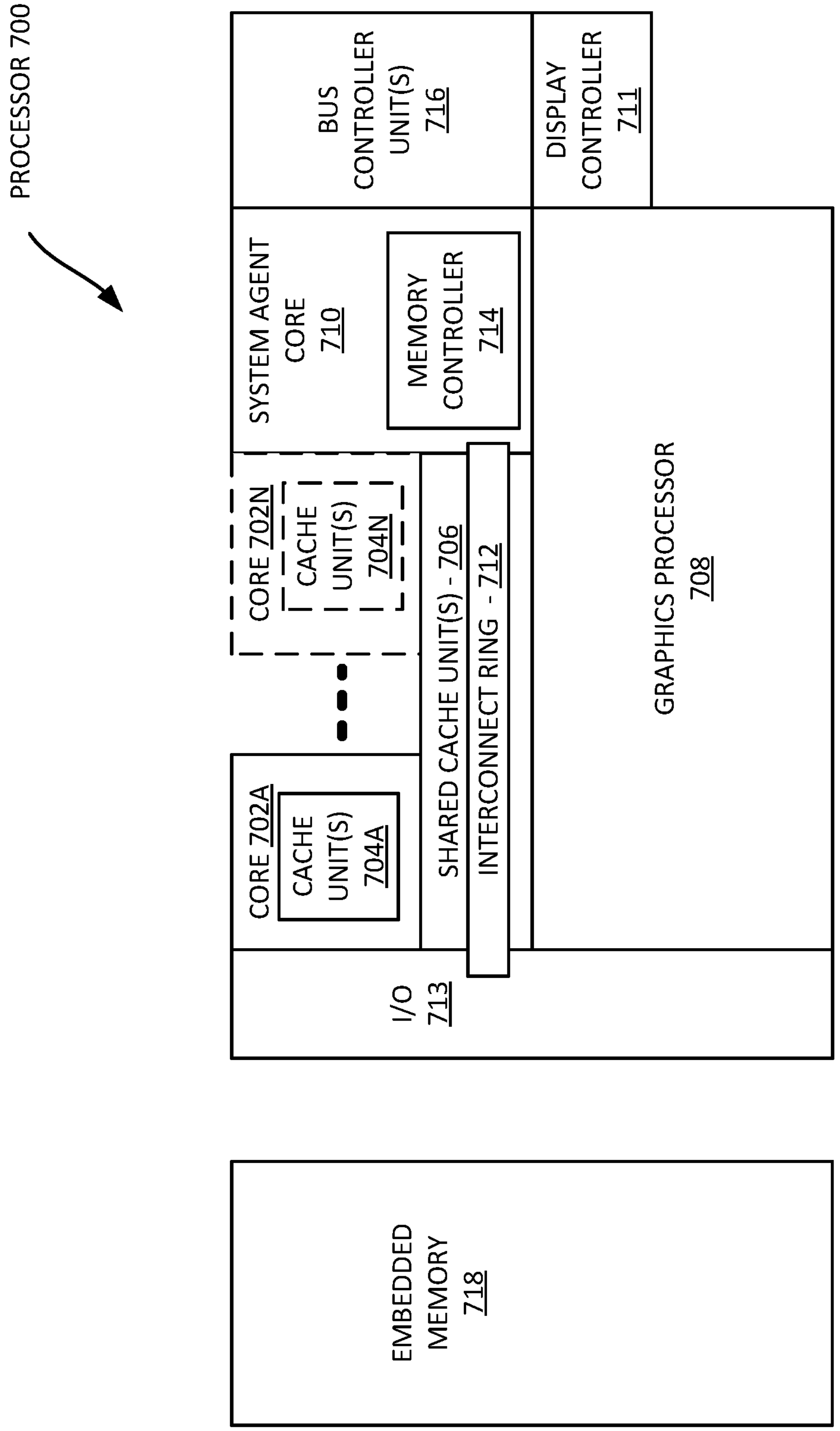
FIG. 7 illustrates various components of a processer in accordance with some embodiments.

FIG. 7 is a block diagram of an embodiment of a processor 700 having one or more processor cores 702A to 702N, an integrated memory controller 714, and an integrated graphics processor 708. Those elements of FIG. 7 having the same reference numbers (or names) as the elements of any other figure herein can operate or function in any manner similar to that described elsewhere herein, but are not limited to such. Processor 700 can include additional cores up to and including additional core 702N represented by the dashed lined boxes. Each of processor cores 702A to 702N includes one or more internal cache units 704A to 704N. In some embodiments each processor core also has access to one or more shared cached units 706.

The internal cache units 704A to 704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A to 704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A to 702N include support for simultaneous multi-threading. In such embodiment, the system agent core 710 includes components for coordinating and operating cores 702A to 702N during multi-threaded processing. System agent core 710 may additionally include a power control unit (PCU), which includes logic and components to regulate the power state of processor cores 702A to 702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring-based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702 to 702N and graphics processor 708 use embedded memory modules 718 as a shared Last Level Cache.

In some embodiments, processor cores 702A to 702N are homogenous cores executing the same instruction set architecture. In another embodiment, processor cores 702A to 702N are heterogeneous in terms of instruction set architecture (ISA), where one or more of processor cores 702A to 702N execute a first instruction set, while at least one of the other cores executes a subset of the first instruction set or a different instruction set. In one embodiment processor cores 702A to 702N are heterogeneous in terms of microarchitecture, where one or more cores having a relatively higher power consumption couple with one or more power cores having a lower power consumption. Additionally, processor 700 can be implemented on one or more chips or as an SoC integrated circuit having the illustrated components, in addition to other components.

The following examples pertain to further embodiments. Example 1 includes a plug structure comprising: a paddle card to couple two wires to two gold fingers; and a first add-on plug to couple a first wire to a first gold finger, wherein the paddle card and the first add-on plug are to be stacked to form a single plug structure having a first row of gold fingers and a second row of gold fingers. Example 2 includes the plug structure of example 1, wherein the two gold fingers are to provide the first row of gold fingers. Example 3 includes the plug structure of example 1, wherein the first gold finger is to provide the second row of gold fingers. Example 4 includes the plug structure of example 1, wherein the paddle card and the first add-on plug are to be stacked to form the single plug structure based at least in part on one or more alignment features. Example 5 includes the plug structure of example 1, wherein the first wire is to be soldered to the first add-on plug. Example 6 includes the plug structure of example 1, further comprising a second add-on plug to couple a second wire to a second gold finger, wherein the paddle card, the first add-on plug, and the second add-on plug are to be stacked to form the single plug structure having the first row of gold fingers and the second row of gold fingers. Example 7 includes the plug structure of example 6, wherein the first gold finger and the second gold finger are to provide the second row of gold fingers. Example 8 includes the plug structure of example 6, wherein the paddle card, the first add-on plug, and the second add-on plug are to be stacked to form the single plug structure based at least in part on one or more alignment features. Example 9 includes the plug structure of example 6, wherein the second wire is to be soldered to the second add-on plug. Example 10 includes the plug structure of example 6, further comprising an overmold to encompass an electrical contact between the second wire and the second add-on plug. Example 11 includes the plug structure of example 6, further comprising an overmold to encompass: an electrical contact between the first wire and the first add-on plug; an electrical contact between the second wire and the second add-on plug; and an electrical contact between the two wires and the paddle card. Example 12 includes the plug structure of example 1, further comprising an overmold to encompass an electrical contact between the first wire and the first add-on plug. Example 13 includes the plug structure of example 1, further comprising an overmold to encompass: an electrical contact between the first wire and the first add-on plug; and an electrical contact between the two wires and the paddle card.

Example 14 includes a system comprising: a motherboard having a connector to receive a plug; and the plug including: a paddle card to couple two wires to two gold fingers; and a first add-on plug to couple a first wire to a first gold finger, wherein the paddle card and the first add-on plug are to be stacked to form a single plug having a first row of gold fingers and a second row of gold fingers. Example 15 includes the system of example 14, wherein the two gold fingers are to provide the first row of gold fingers. Example 16 includes the system of example 14, wherein the first gold finger is to provide the second row of gold fingers. Example 17 includes the system of example 14, wherein the paddle card and the first add-on plug are to be stacked to form the single plug based at least in part on one or more alignment features. Example 18 includes the system of example 14, wherein the first wire is to be soldered to the first add-on plug. Example 19 includes the system of example 14, further comprising a second add-on plug to couple a second wire to a second gold finger, wherein the paddle card, the first add-on plug, and the second add-on plug are to be stacked to form the single plug having the first row of gold fingers and the second row of gold fingers. Example 20 includes the system of example 14, further comprising a processor, having one or more processor cores, wherein the processor is to communicate with a device via the plug. Example 21 includes an apparatus comprising means to perform a method as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A plug structure comprising:

a paddle card to couple two wires to two gold fingers; and a first add-on plug to couple a first wire to a first gold finger, wherein the paddle card and the first add-on plug are to be stacked to form a single plug structure having a first row of gold fingers and a second row of gold fingers.

2. The plug structure of claim 1, wherein the two gold fingers are to provide the first row of gold fingers.

3. The plug structure of claim 1, wherein the first gold finger is to provide the second row of gold fingers.

4. The plug structure of claim 1, wherein the paddle card and the first add-on plug are to be stacked to form the single plug structure based at least in part on one or more alignment features.

5. The plug structure of claim 1, wherein the first wire is to be soldered to the first add-on plug.

6. The plug structure of claim 1, further comprising a second add-on plug to couple a second wire to a second gold finger, wherein the paddle card, the first add-on plug, and the second add-on plug are to be stacked to form the single plug structure having the first row of gold fingers and the second row of gold fingers.

7. The plug structure of claim 6, wherein the first gold finger and the second gold finger are to provide the second row of gold fingers.

8. The plug structure of claim 6, wherein the paddle card, the first add-on plug, and the second add-on plug are to be stacked to form the single plug structure based at least in part on one or more alignment features.

9. The plug structure of claim 6, wherein the second wire is to be soldered to the second add-on plug.

10. The plug structure of claim 6, further comprising an overmold to encompass an electrical contact between the second wire and the second add-on plug.

11. The plug structure of claim 6, further comprising an overmold to encompass:

an electrical contact between the first wire and the first add-on plug;

an electrical contact between the second wire and the second add-on plug; and an electrical contact between the two wires and the paddle card.

12. The plug structure of claim 1, further comprising an overmold to encompass an electrical contact between the first wire and the first add-on plug.

13. The plug structure of claim 1, further comprising an overmold to encompass:

an electrical contact between the first wire and the first add-on plug; and an electrical contact between the two wires and the paddle card.

14. A system comprising:

a motherboard having a connector to receive a plug; and the plug including:

a paddle card to couple two wires to two gold fingers; and a first add-on plug to couple a first wire to a first gold finger, wherein the paddle card and the first add-on plug are to be stacked to form a single plug having a first row of gold fingers and a second row of gold fingers.

15. The system of claim 14, wherein the two gold fingers are to provide the first row of gold fingers.

16. The system of claim 14, wherein the first gold finger is to provide the second row of gold fingers.

17. The system of claim 14, wherein the paddle card and the first add-on plug are to be stacked to form the single plug based at least in part on one or more alignment features.

18. The system of claim 14, wherein the first wire is to be soldered to the first add-on plug.

19. The system of claim 14, further comprising a second add-on plug to couple a second wire to a second gold finger, wherein the paddle card, the first add-on plug, and the second add-on plug are to be stacked to form the single plug having the first row of gold fingers and the second row of gold fingers.

20. The system of claim 14, further comprising a processor, having one or more processor cores, wherein the processor is to communicate with a device via the plug.

* * * * *